United States Patent Office 3,519,487
Patented July 7, 1970

3,519,487
VENTED POROUS FUEL CELL ELEMENT AND PROCESS
Günter Wolf and August Winsel, Kelkheim, Germany, assignors to Varta Aktiengesellschaft, Frankfurt am Main, Germany
Filed Oct. 5, 1967, Ser. No. 673,214
Claims priority, application Germany, Oct. 8, 1966, 1,596,304
Int. Cl. H01m 27/12
U.S. Cl. 136—86                                    12 Claims

ABSTRACT OF THE DISCLOSURE

A fuel cell with one or more porous gas diffusion electrodes which are composed of two fine pore covering layers and at least one coarser pore catalyst working layer in which hydrazine is converted into hydrogen and nitrogen, is provided with means for both venting a gaseous by-product such as nitrogen from the cell and regulating the flow of a liquid containing hydrazine, or a salt thereof, or a liquid containing hydrogen peroxide into the cell.

A further embodiment of the disclosure lies in the use of the electrical output of the fuel cell elements of the fuel cell to regulate the flow into the fuel cell of one or more of the liquid materials.

BACKGROUND OF THE INVENTION

This invention relates generally to fuel cells which are used for the direct conversion of chemical energy into electrical energy and more particularly to fuel cells of the type in which a liquid containing hydrazine or a salt thereof is converted into hydrogen gas and in which the hydrogen gas is in turn reacted with an oxidizing agent such as gaseous oxygen in order to form electrical energy, and water as a by-product.

The hydrogen gas may be generated in the hydrogen electrode of the fuel cell. Such electrodes contain a gas generating, or working, layer charged with a catalyst which is capable of catalyzing the decomposition of hydrazine, or solutions which contain hydrazine salts, into hydrogen and nitrogen. The catalyst must also be capable of catalyzing the desired electrochemical reaction of the hydrogen gas. These electrodes are porous and in the pores thereof during the operation of the fuel cell a liquid electrolyte is present along with the hydrogen gas and the catalyst, and due to the catalytic effect of the catalyst on the hydrogen gas, the hydrogen gas goes into solution in the electrolyte in the form of hydrogen ions, whereby the electrode produces one electron per hydrogen atom, which thus results in a supply of electric current by the fuel cell.

In the oxygen diffusion electrodes of such fuel cell systems the oxygen gas goes into solution electrochemically in the form of ions at the point of contact between the electrolyte, the oxygen gas and the catalyst, for example silver, and thereby absorbs one electron from the electrode for each atom of oxygen dissolved in the solution.

U.S. 3,121,031 discloses that a mixture of hydrazine and an electrolyte such as an aqueous solution of strong alkali may be introduced into a fuel cell electrode from a common storage tank. The electrode houses a charge of catalyst material, in the form of a coarse powder, between two fine pored sieved shells. Upon contacting the catalyst in the electrode the liquid containing hydrazine is converted into hydrogen gas, which can be subsequently used in electro-chemical reactions, and into nitrogen gas. Some ammonia is also formed during the process. The nitrogen, the ammonia, and the remaining hydrogen which does not undergo the electrochemical reaction, escape into the electrolyte surrounding the electrode through the surfaces of the electrode which have been provided with pores for this purpose.

German Pat. No. 1,189,168 describes a process in which hydrazine, for example, is used as the more easily dehydrogenated auxiliary fuel, is introduced into the catalyst working layer of a multi-layer fuel electrode and wherein the supply of hydrazine is determined by the voltage of the fuel cell.

British Pat. 1,014,232 discloses a process for the operation of a fuel cell with hydrazine in which a mixture of hydrazine and electrolyte is introduced into an electrode, which consists of only a single catalyst charged hydrogen producing layer and which electrode is separated from its opposing electrode by an ion exchange membrane. The feed of the liquid hydrazine is regulated in such a way that the hydrazine is almost completely reacted on the fuel cell electrode.

Prior to the advent of the present invention, therefore, those in the art were still faced with the problem of providing devices which could be used with multilayer gas diffusion electrodes to enhance the operation of fuel cells incorporating such electrodes in which free hydrogen is used which has been obtained by the decomposition of hydrazine. Such sought after devices would, for example, provide means whereby the free nitrogen which is also formed during the decomposition of the hydrazine could be removed from the electrode without disrupting the operation of that fuel cell element.

Such a device would also permit the complete use of the hydrogen gas, which is produced by the decomposition of the hydrazine, in the subsequent electrochemical reaction. Such a device would also enable the user thereof to provide a suitable adjustment of the hydrazine supply in accordance with the electrical output of the fuel cell.

SUMMARY OF THE INVENTION

An object of the present invention, therefore, is to provide for the facile removal of nitrogen or other gaseous by-products from multi-layer, porous gas diffusion electrode elements which are used in fuel cells without disrupting the operation of such cells, or in particular, interfering with the complete use of the fuel gases, such as hydrogen.

Another object of the present invention is to provide for a suitable regulation of the flow of fuel cell reactants, such as a liquid containing hydrazine or a liquid containing peroxide to the fuel cell depending on the needs of the cell.

The essence of the present invention lies in the use of venting means for the direct removal of gaseous by-products from the pores of the working layer of a fuel electrode, during the operation of the fuel cell.

A further embodiment of the invention also lies in the use of the pressure of the vented gaseous by-product, and/or the electrical output of the cell or the electrodes to regulate the supply of reactants and/or electrolyte to the cell during the operation thereof.

DETAILED DESCRIPTION OF THE INVENTION INCLUDING PREFERRED EMBODIMENT

Figure 1:
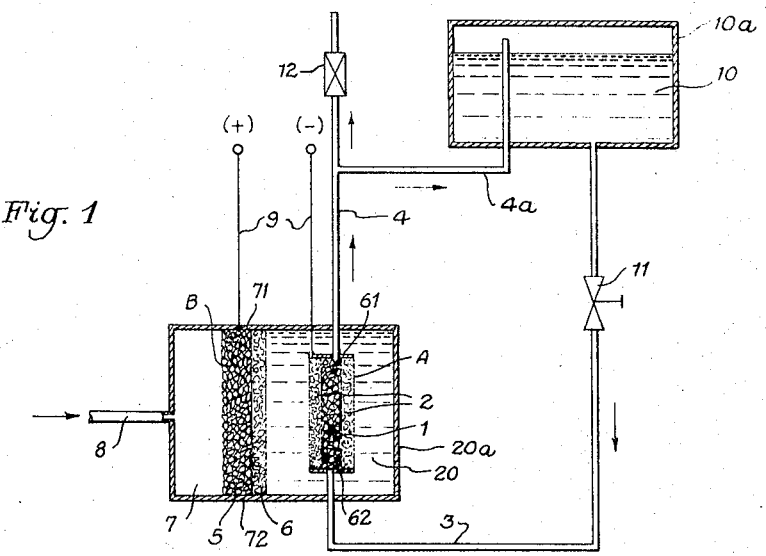
FIG. 1 is a schematic view of one mode of operation of a fuel cell in accordance with the present invention wherein by-product gas is vented from the cell and used to pressurize the simultaneous supplying of one reactant and electrolyte to the cell with the aid of a manually operated valve in the supply line.

The problems thus posed are solved according to the present invention whereby a gas discharge or venting line having an excess pressure relief valve is connected to the catalyst charged gas generating layer of a gas diffusion electrode to allow for the venting of the nitrogen that is also produced with the hydrogen. The catalyst charged, hydrogen gas generating layer is part of a porous gas diffusion fuel electrode which has several layers of different average pore diameters. The two outer-cover layers of the electrode have very fine pores and the catalyst containing hydrogen generating working layers have coarse pores. The gas discharge or venting line is also connected to the source of supply of the liquid hydrazine from which the hydrogen and nitrogen gases are formed upon contact of the hydrazine with the catalyst. The pressure of the vented nitrogen gas may then be used to regulate, with the aid of an appropriately placed valve, the flow of hydrazine into the electrode. The operation of such valve may also be regulated by the voltage of the cell, in which the electrode is located, during the operation thereof.

The gas diffusion electrode which is equipped with the gas discharge or venting line according to the present invention contains one or more coarser pore separate hydrogen gas generating working layers containing the catalyst between the outer fine pored covering layers of the electrode. Equipping the gas diffusion electrode having fine pore outer covering layers with the venting line and excess pressure relief valve according to the present invention prevents leakage of the generated gases from the gas generating working layer into the electrolyte surrounding the electrode. The gas generating layer is blown free of the electrolyte, by means of the pressure that is built up in the gas generating layer as gaseous hydrogen, nitrogen and ammonia are generated therein during the operation of the cell by catalytic decomposition. The gases in the gas generating layer cannot escape into the electrolyte surrounding the electrode as long as the gas pressure in such gas generating layer is maintained, by means of the excess pressure relief valve and venting line, below the combined capillary pressure of the electrolyte in the fine pores of the outer covering layers of the electrode and the hydrostatic pressure exerted on the fine pored covering layers of the electrode by the electrolyte in the electrolyte chamber.

In the operation of a fuel cell, in accordance with the present invention, in which hydrazine is used as one of the fuels, or actually, a fuel percursor, the liquid containing hydrazine or a salt thereof is fed into one side of a gas generating layer located within a gas diffusion electrode. The gas generating layer contains a catalyst material which is capable of converting the hydrazine into hydrogen gas and nitrogen gas upon contact therewith. Some ammonia may also form due to subsequent interaction between some of the hydrogen and nitrogen. The resulting gaseous mixture of hydrogen and nitrogen, principally, is permitted to flow through the gas generating layer towards the gas venting or discharge line, and during this flow period the hydrogen content of the mixture is depleted due to the use of the hydrogen in the simultaneously conducted electrochemical reaction in the cell. The flow of the liquid hydrazine to the electrode can be so metered that the hydrogen gas produced therefrom in the gas generating layer is completely reacted in the electrochemical reaction during the above mentioned flow period, so that only nitrogen, and perhaps a small amount of ammonia, is present at the end of the flow period to be vented through the gas discharge line and pressure relief valve. By reason of the use of a constant flow of the generated gas mixture through the gas generating layer in accordance with the present invention, the formation of pockets of inert gas in the coarse pores of the catalyst in such layer is also avoided. If a higher electrical output is removed from the electrode or the cell for a given charge of hydrazine, a polarization voltage may form on the electrode due to resulting pockets of inert gas. This voltage may be used with the aid of an amplifier, however, to actuate a magnetic valve or other metering device whereby the flow of hydrazine to the cell may be increased and thereby lead to an increased flow of generated gases which, in turn, would remove the inert pockets of gas formed as indicated above.

The control of the supply of hydrazine by means of the voltage of the fuel cell electrode can also be accomplished without the need for a cut-in switch of an automatic device. By comparing the output of the electrode or the cell, as measured by the amperage, to an empirically determined value, one can operate a manually operated valve to supply hydrazine to the cell as the circumstances warrant.

Of particular value and utility is a fuel cell in which, in addition to the use of hydrazine as a fuel or a fuel percursor, a liquid oxidizing agent, such as hydrogen peroxide, is also used. The hydrogen peroxide may also be supplied from its storage container through a metering valve, which is also automatically controlled, into the coarse pored gas forming catalyst layer of the multi-layer oxygen electrode. The automatic control of the feed of the hydrogen peroxide can also be regulated by the use of voltage of the oxygen electrode or the cell to actuate the metering valve as desired.

Referring to the drawings, FIG. 1 depicts one embodiment of a fuel cell system utilizing the present invention. Electrode A is a gas diffusion electrode composed of two fine pored outer covering layers 2 housing a coarse pored gas generating working layer 1 containing the catalyst. The top 61 and bottom 62 of electrode A are both impervious to the passage of gases or liquids therethrough. Electrode A is one of two electrodes housed in cell 20a and it is surrounded by electrolyte 20. The electrolyte may be, for example, an aqueous solution of potassium hydroxide of approximately 6 n. Gas generating working layer 1 is connected at the bottom thereof by way of supply pipe line 3 and hand valve 11 with storage container 10a which, for use in a hydrazine fueled cell, could contain a mixture of hydrazine and potassium hydroxide electrolyte 10. Gas generating catalyst layer 1 is also vented at the top thereof by gas lines 4 and 4a and pressure relief valve 12 for the venting of gases such as nitrogen and ammonia which are formed as byproducts during the formation of hydrogen in layer 1 when the hydrazine contacts the hydrogen forming catalyst in such layer. A small amount of unreacted residual hydrogen may also be present and vented with the nitrogen and ammonia. The vented gas will flow through gas line 4a into container 10a and build up a positive pressure above the liquid material 10 therein. This positive pressure may be used to force the liquid material 10 through pipe line 3 into layer 1 when valve 11 is opened. Cell 20a also contains a second gas diffusion electrode B which may be used as the oxygen electrode in a hydrogen/oxygen fuel cell. Electrode B is composed of a fine pored cover or shell layer 6 adjacent electrolyte 20 and a coarse pored catalyst layer 5. The bottom 71 and top 72 of electrode B are impervious to the passage of either gases or liquids therethrough. Electrode B thus separates the electrolyte 20 from chamber 7 from which oxygen may be supplied to electrode B. Oxygen gas is supplied to chamber 7 through gas line 8. The electrical output of cell 20a is taken off through electric lines 9.

Figure 2:
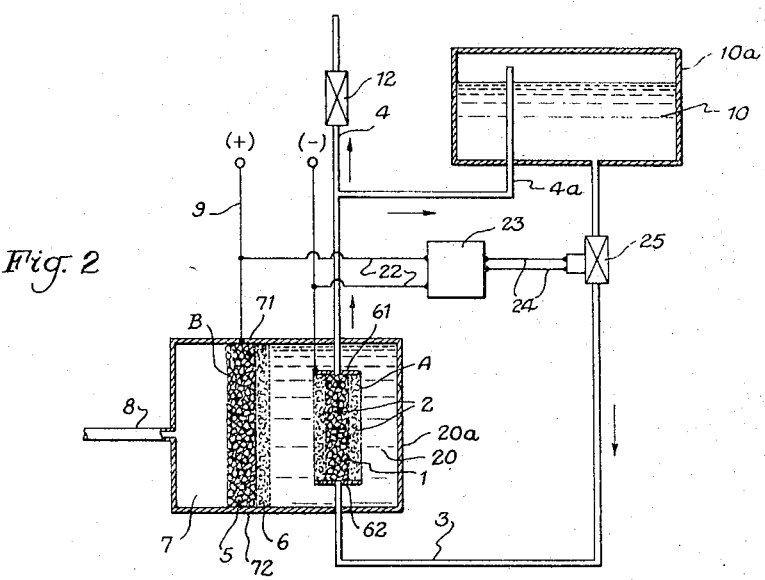
FIG. 2 is a variation of the operation shown in FIG. 1 wherein the feed through the valve in the supply line is regulated by the electrical output of the cell during the operation thereof.

FIG. 2 depicts a variation of the fuel cell system shown in FIG. 1. In the system shown in FIG. 2 valve 25 has replaced hand valve 11. Valve 25 is a metering device which is automatically controlled in accordance with the voltage of fuel cell 20a or electrode A. In order to effect such control metering amplifier 23 is attached to electrical output lines 9 by means of electric lines 22. The amplifier is thus able to meter the voltage or output of cell 20a or electrode A and in turn emit signals of its own over electric lines 24 to valve 25 to automatically actuate the opening and closing of valve 25 and thereby regulate the flow of hydrazine and electrolyte into electrode B. In this way the output of cell 20a or electrode A can be used to automatically regulate the flow of hydrazine into the cell.

Figure 3:
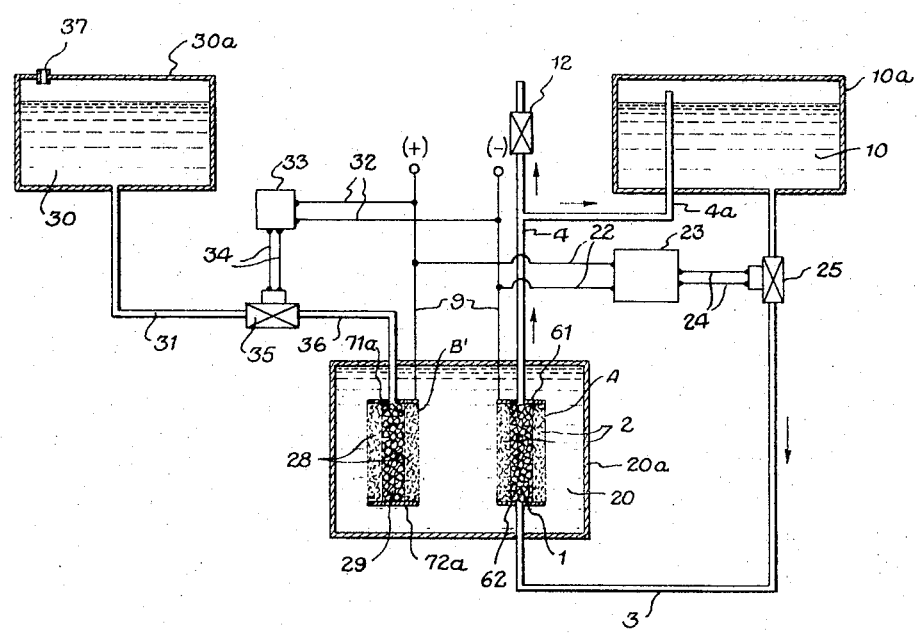
FIG. 3 is a further variation of the operation shown in FIGS. 1 and 2 wherein the flow of all the reactants and the electrolyte to the cell is regulated by the electrical output of the cell during the operation thereof.

FIG. 3 depicts a modification of the cell system of FIG. 2. In the cell system of FIG. 3 the fuel for the oxygen electrode B' is now supplied in the form of a solution of hydrogen peroxide instead of in the form of gaseous oxygen. The oxygen electrode B' is composed of two fine pored outer layers or shells 28 having an inner coarse pored, gas generating catalyst layer 29 which is charged with a catalytic material capable of transforming the hydrogen peroxide into gaseous oxygen and water, as a byproduct. The top 71a and bottom 72a of electrode B' are impervious to the passage of either gases or liquids therethrough. Electrodes A and B' are both surrounded by electrolyte 20. Storage container 30a houses a supply of the hydrogen peroxide solution 30, which can be supplied to electrode B', as needed, through pipe lines 31 and 36. The regulation of the feed of the hydrogen peroxide solution from container 30a to electrode B' can also be regulated by means of the voltage of cell 20a or electrode B'. For this purpose a second metering amplifier 33 and a second automatic magnetic valve 35 are provided. Amplifier 33 meters the voltage or output of cell 20a or electrode B' over electric lines 32 and in turn emits signals of its own over electric lines 34 to valve 35 to automatically actuate the opening or closing of valve 35 and thereby regulate the flow of hydrogen peroxide into electrode B'. Depending on empirically provided settings for valve 35 and amplifier 33, gas generating layer 29 of oxygen electrode B' is automatically provided with hydrogen peroxide solution from container 30a through supply lines 31 and 36, and the hydrogen peroxide is transformed into oxygen and water when it comes in contact with the catalyst provided therefor in layer 29. Orifice 37 is vented to the atmosphere so that the atmospheric pressure thus forces liquid 30 through lines 31 and 36 and valve 35 into electrode B. Alternatively a line connected to line 4 or a supply of bottled gas may be used as the source of supply pressure.

Fuel cells constructed in accordance with the present invention allow for a favorable use therein of liquid hydrazine as a fuel, or fuel precursor. This liquid material can be stored in a significantly simpler manner than hydrogen gas.

The apparatus and process of the present invention, therefore, allows for the almost complete use of a fuel such as hydrazine or a salt thereof and the hydrogen generated therefrom in electrochemical reactions without any loss thereof, since, because of the capillary pressure of the electrolyte in the fine pores of the cover layers or shells of the electrodes, an escape of the hydrogen fuel gas from the gas generating layer of the electrode into the electrolyte adjacent or surrounding the electrode is prevented and by regulating the flow of the gas mixture through the gas generating layer of the electrode by a suitable adjustment of the valve metering the rate of supplying hydrazine into the electrode a complete utilization of the hydrogen gas in the gas mixture is achieved during the time in which the gas mixture passes through the gas generating layer. The nitrogen formed during the decomposition of the hydrazine is not allowed to form inert gas pockets in the gas generating layer of the electrode, when the apparatus and process of the present invention is utilized, since a continuous flow of gas is achieved from the point where the hydrazine enters the electrode to the point where the exiting gases are vented through the gas discharge lines and pressure relief valve.

By the proper adjustment of the gas pressure in the gas generating layer of the electrode the intrusion of the electrolyte from the electrolyte chamber into such gas generating layer can be prevented. For this purpose, sufficient hydrazine must be supplied to provide the hydrogen gas and nitrogen gas needed to provide the desired gas pressure build up within the electrode. It is to be noted though, that if the gas pressure in the electrode becomes too high, the passage of the hydrogen gas through the fine pore covering layers and into the electrolyte chamber would occur and thereby cause a temporary shut down of the electrical output of the cell. This is prevented by a suitable setting of the pressure relief valve which is automatically actuated before the gas pressure in the working layer reaches a value equal to the combined capillary pressure of the electrolyte in the pores of the covering layers and the hydrostatic pressure in the electrolyte chamber.

The gas pressure in the working layer also serves to blow that layer free of the solvent in which hydrazine or a salt thereof was dissolved before decomposition and in the case of oxygen electrodes of the water which remains when oxygen is generated from hydrogen peroxide.

The pores of the fine pored shells or outer covering layers of the electrodes used in the present invention may, for example, have openings of about $0.1\mu$ to $15\mu$ in diameter. The coarse pores in the oxygen or hydrogen generating layers may have, for example, average diameters in the order of $15\mu$ to $250\mu$.

We claim:

1. In a process of operating a fuel cell having at least two electrodes at least one of which is a gas diffusion electrode used as a fuel electrode therein, said gas diffusion electrode having two fine pore covering layers and at least one coarse pore working layer containing a catalyst for the electrochemical conversion of hydrogen and the decomposition of hydrazine the improvement comprising supplying a liquid containing hydrazine in solution from a closed source external to said cell to said working layer at such a rate that the pore system of said working layer is at least partially filled with a mixture of hydrogen and nitrogen generated in the catalytic decomposition, and conducting the nitrogen remaining after the electrochemical conversion of the hydrogen gas from said working layer to pressurize the closed source of said liquid for said working layer.

2. A process as in claim 1 in which the gas is vented containing a major proportion of said nitrogen gas and a minor proportion of hydrogen gas.

3. A process as in claim 1 in which an electric potential operated valve is supplied between said closed source and said gas diffusion electrode and in which an electric potential is developed by said cell which potential is used to regulate the flow of said pressurized supply of said liquid to said electrode through said valve.

4. A process as in claim 3 in which said cell comprises at least one pair of gas diffusion electrodes separated by an electrolyte, one electrode of each of said pairs of gas diffusion electrodes being an oxygen electrode and the other electrode of each of said pairs of gas diffusion electrodes being a hydrogen electrode, and a hydrogen gas forming liquid is supplied to said hydrogen electrode and in which, in the working layer of said hydrogen electrode, nitrogen gas is generated as the principal gaseous byproduct, the vented nitrogen gas being used to pressurize the supply of hydrogen gas-forming liquid toward the working layer of said hydrogen electrode, and wherein metering of the necessary operating quantities of said gas-forming liquid to the cell is regulated, during operation, by the electric potential developed in the cell.

5. In an electrochemical fuel cell system comprising a fuel cell housing at least one pair of electrodes separated by an electrolyte wherein at least one of each of said pair of electrodes is a vertically disposed porous gas diffusion electrode and a raw material to be charged to said electrode in which gaseous reactants and by-products are formed, said gas diffusion electrode having two outer fine pored covering layers facing said electrolyte and at least one inner coarse pored gas generating catalyst containing working layer, electric output lines adapted to remove the electric output of said cell during the operation thereof, a raw material storage and supply line means including valve means therein adapted to store, and to supply said working layer of the gas diffusion electrode with the raw material charge through the bottom of said valve means in said supply line means, said raw material being a liquid containing hydrazine needed to operate said cell in said storage and supply line means, the improvement comprising gaseous nitrogen venting means, gas venting means including pipe means and a pressure relief valve means therein, connected to the top of said gas diffusion electrode working layer and adapted to vent gaseous nitrogen directly from said cell.

6. The electrochemical fuel cell system as in claim 5 wherein said gaseous by-product gas venting means further includes pipe means connected to said storage means to pressurize the liquid raw material charge in said raw material storage means.

7. The electrochemical fuel cell system as in claim 6 wherein electric amplifier means and electric valve operating means are provided said amplifier means being connected by second electric lines to said electric output lines and by third electric lines to the valve operating means in said supply line means adapted to enable the electric potential of at least one of said porous gas diffusion electrodes to be used to automatically regulate the flow of raw material through said supply line means by automatically operating the opening and closing of said supply line valve means.

8. The electrochemical fuel cell system as in claim 7 wherein
all the electrodes are gas diffusion electrodes having at least one outer fine pored layer facing said electrolyte and at least one inner, catalyst containing coarse pored gas generating working layer,
only one electrode of each pair of the said electrodes being vented by the said gaseous by-product venting means, and in which the supply of all the raw materials necessary for the operation of the cell is automatically metered to the electrodes by the potential generated in at least one of the individual electrodes.

9. In a hydrazine fueled electrochemical fuel cell system comprising
a fuel cell having at least one set of one oxygen electrode and one hydrogen electrode separated by an electrolyte,
each of said electrodes being a porous gas diffusion electrode having at least one outer fine pored layer facing said electrolyte and at least one inner, coarse pored, catalyst containing working layer, electric output lines adapted to remove the electric output of said cell during the operation thereof,
electrolyte between said electrodes gas generating raw material storage and supply line means including valve means therein connected to said electrodes, the raw material supply line for said hydrogen electrode being connected to the bottom of the working layer of said hydrogen electrode, the improvement comprising gaseous by-product venting means, comprising gas line means with pressure relief valve means therein, connected to the top of said hydrogen electrode and adapted to vent gaseous by-products directly from said cell.

10. The hydrazine fueled electrochemical fuel cell system as in claim 9 wherein the gas lines of said gaseous by-product venting means include a branch of gas line extended into the raw material storage means whereby said storage means is pressurized with vented gaseous by-product.

11. The hydrazine fueled electrochemical fuel cell system as in claim 9 further including electric potential operated valve actuating means, electric amplifier means, second electric lines connecting said amplifier means to said electric output lines and third electric lines connecting said amplifier means to the valve actuating means in the hydrazine raw material supply line whereby
the electric potential of said cell is used to automatically regulate the flow of liquid fuel through the fuel supply line by automatically operating the fuel supply line valve means in accordance with the needs of the cell.

12. A hydrazine fueled electrochemical fuel cell system as in claim 11 in which a hydrogen peroxide storage means is provided, and a valved supply line connects said hydrogen peroxide storage means to said oxygen cell, electric valve operating means for said valve in said valved supply line and further electric amplifier means, fourth electric lines connecting said further amplifying means to said electric output lines and fifth electric lines connecting said further amplifier to the valve operating means in the supply line for said hydrogen peroxide whereby the electric potential of said cell will automatically regulate the flow of said liquid through the supply line by automatically operating the valve means in said supply line.

References Cited

UNITED STATES PATENTS

| 3,121,031 | 2/1964 | Gruneberg et al. | 136—86 |
| 3,382,103 | 5/1968 | Smith | 136—86 |
| 3,390,015 | 6/1968 | Wilson | 136—86 |
| 3,410,729 | 11/1968 | Manion | 136—86 |
| 3,415,734 | 12/1968 | Kalhammer | 136—86 |

FOREIGN PATENTS

| 1,011,076 | 11/1965 | Great Britain. |
| 1,044,154 | 9/1966 | Great Britain. |

WINSTON A. DOUGLAS, Primary Examiner

M. J. ANDREWS, Assistant Examiner